Jan. 30, 1968  C. H. HOGAN ETAL  3,366,363
VENT VALVE
Filed Aug. 9, 1965  2 Sheets-Sheet 1
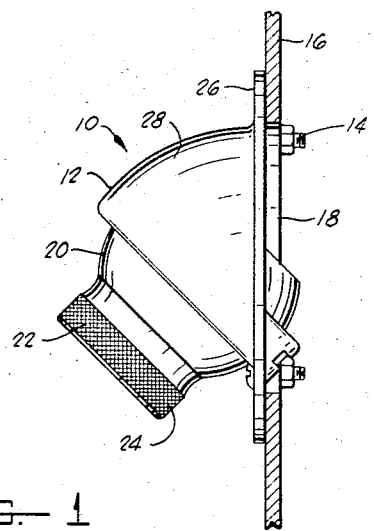
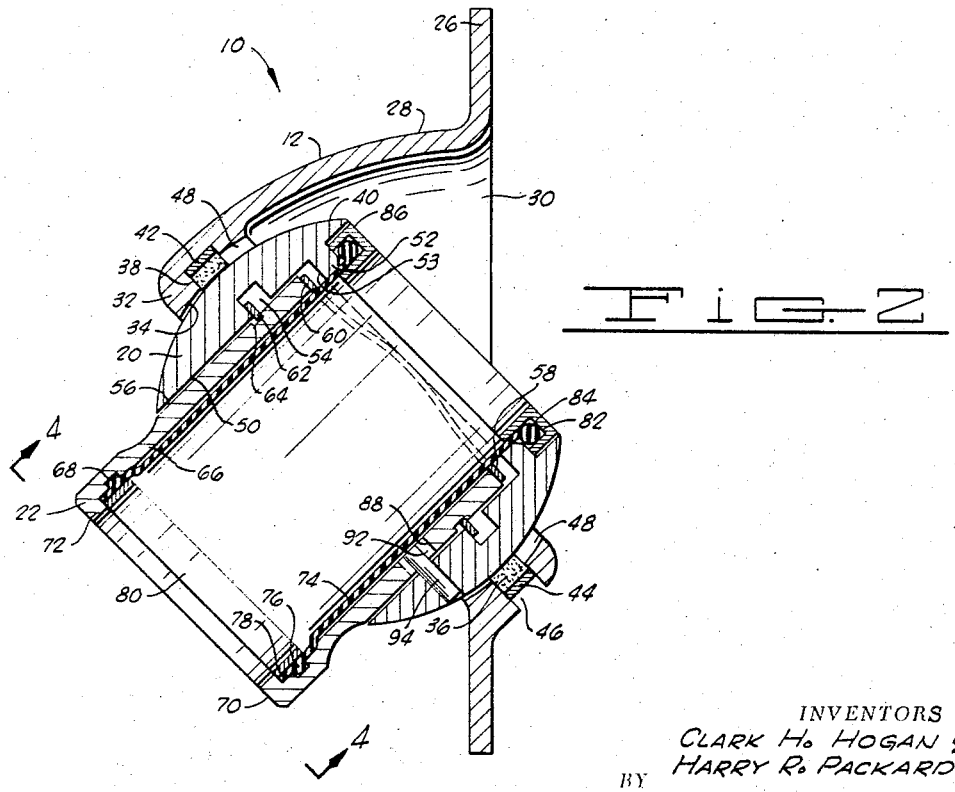
INVENTORS
CLARK H. HOGAN &
HARRY R. PACKARD
BY
Dunlap and Laney
ATTORNEYS Jan. 30, 1968  C. H. HOGAN ETAL  3,366,363

VENT VALVE

Filed Aug. 9, 1965  2 Sheets-Sheet 2

INVENTORS.
CLARK H. HOGAN &
HARRY R. PACKARD
BY
Dunlap and Laney
ATTORNEYS

United States Patent Office 3,366,363
Patented Jan. 30, 1968

3,366,363
VENT VALVE
Clark H. Hogan and Harry R. Packard, Oklahoma City, Okla., assignors to H & E Aircraft Company, Oklahoma City, Okla., a corporation of Oklahoma
Filed Aug. 9, 1965, Ser. No. 478,159
10 Claims. (Cl. 251—4)

This invention relates generally to improved fluid flow control valves. More particularly, but not by way of limitation, this invention relates to an improved vent valve useful for controlling air flow in the air conditioning system of air liners, trains, buses and the like.

With the advent of air conditioning systems for the personnel compartments of public transportation vehicles, it has become common practice, in addition to the general air conditioning system provided for the compartments, to provide individually controlled vents or outlets located adjacent the passenger seats whereby the individual in the seat can regulate, at least to some extent, the temperature of the immediate area in which he is situated. The vent valves used in the past have generally been adjustable both in direction and in the volume of air flow passing therethrough.

The adjustment of the volume of air flowing through the valve is usually attained by restricting an orifice in the valve body by screwing a tapered closure member into the orifice; by varying the alignment between a fixed port and a movable port located in the valve; or by varying the position of a disc that is pivotally mounted in the valve.

Generally, this invention provides an improved valve including telescopically arranged inner and outer members having coaxial bores extending therethrough, the members being rotatable relative to each other; and, a resilient sleeve having a first end attached to the inner member and a second end attached to the outer member, the sleeve being disposed within the bores and, when in the relaxed condition, being concentrically arranged with respect to the bores whereby the valve is open and, when the members are rotated relative to each other, the sleeve being deformed to block the bores whereby the valve is closed.

One object of the invention is to provide an improved valve that can be quickly and easily adjusted to control the flow of air therethrough.

Another object of the invention is to provide an improved vent valve that can be moved from the open to the closed position by rotating an inner member approximately 180° relative to the outer member.

Still another object of the invention is to provide an improved valve that can be adjusted to control the volume of flow therethrough and that will remain in the adjusted position until moved therefrom.

Still another object of the invention is to provide an improved valve that can be quickly, easily and economically manufactured.

An additional object of the invention is to provide an improved valve that requires little or no maintenance during its service life.

The foregoing and additional objects and advantages of the invention will become more apparent as the following detailed description is read in conjunction with the accompanying drawings wherein like reference characters denote like parts in all views and wherein:

FIG. 1 is a side elevation view of a valve constructed in accordance with the invention;

FIG. 2 is an enlarged, vertical cross-sectional view taken through the valve of FIG. 1;

Figure 3:
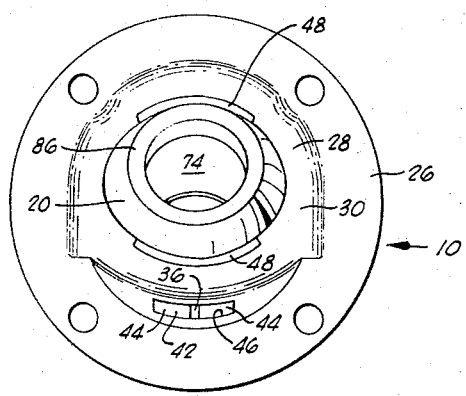
FIG. 3 is a rear view of the valve of FIG. 1.

Referring to the drawing and to FIG. 1 in particular, shown therein and generally designated by the reference character 10 is a vent valve constructed in accordance with the invention. As illustrated therein, the vent valve 10 includes a mounting member 12 connected by a plurality of threaded fasteners 14 with a bulkhead or wall 16 forming a portion of the duct for an air conditioning system (not shown) with which the valve 10 is used. An opening 18 extends through the wall 16 providing an inlet for air to flow from the air conditioning system into the vent valve 10.

In addition to the mounting member 12, the valve 10 also includes an outer member 20 and an inner member 22. The inner member 22, as will be described more fully hereinafter, is rotatable relative to the outer member 20 and has a knurled surface 24 thereon, providing a non-slip surface by which the inner member 22 may be grasped when adjusting the vent valve 10.

As shown more clearly in FIG. 2, the mounting member 12 is constructed to permit the mounting of the vent valve 10 at an angle with respect to a planar surface. Accordingly, the mounting member 12 is provided with an exterior flange 26 through which the threaded fasteners 14 (see FIG. 1) extend. An arcuate portion 28 of the mounting member 12 has a hollow interior 30 corresponding substantially to the opening 18 extending through the wall 16 to admit air into the valve 10.

An interior, annular flange 32 is located on the outer end of the mounting member 12. The flange 32 has an arcuate inner surface 34 corresponding generally to a spherical zone for purposes that will be explained more fully hereinafter.

An annular seal 36 is located in an annular groove 38 provided in the surface 34. The annular seal 36 is preferably constructed from felt or a similar material and forms a fluid-tight seal between the mounting member 12 and an exterior surface 40 on the outer member 20.

A pair of clamping springs 42 (only one can be seen in FIG. 2) are disposed in the annular groove 38 between the mounting member 12 and the annular seal 36. The springs 42 each extend approximately 180° in the groove 38. The ends 44 of the springs 42 are disposed in an opening 46 that extends through the lower portion of the mounting member 12. The opening 46 is provided so that the springs 42 can be adjusted after assembly of the valve 10 to vary the force exerted by the springs 42 on the annular seal 36. The arrangement of the annular seal 36 and the springs 42 is such that the springs 42 exert a force on the seal 36, biasing the seal 36 into tight sealing engagement with the exterior surface 40 of the outer member 20.

In addition to the annular groove 38, the surface 34 of the mounting member 12 is also provided with a pair of diametrically opposed grooves or kerfs 48. The purpose of the kerfs 48 will be explained more fully in connection with the description of FIG. 3.

As may be clearly seen in FIG. 2, the exterior surface 40 of the outer member 20 defines a zone of a sphere having a diameter corresponding generally to the diameter of the surface 34 of the annular flange 32 on the mounting member 12. However, it is to be noted that the exterior surface 40 is considerably longer than the inner surface 34. The provision of the spherical inner surface 34 and the spherical exterior surface 40 on the outer member 20 permits the positioning of the outer member 20 and the inner member 22 angularly with respect to the mounting member 12. It is during the angular positioning of the outer member 20 and inner member 22 relative to the mounting member 12 that the importance of the force exerted by the annular seal 36 on the exterior surface 40 can be appreciated. The springs 42 are sufficiently strong to force the annular seal 36 against the exterior surface 40 of the outer member 20, whereby friction between the seal 36 and surface 40 retains the outer member 20 in the desired angular position relative to the mounting member 12.

A bore 50 extends through the outer member 20. An inwardly extending annular flange 52 projects into the bore 50 relatively near one end of the outer member 20 forming a shoulder 53 in the bore 50. An annular groove 54 is formed in the medial portion of the outer member 20 adjacent the bore 50. The purpose of the annular flange 52, shoulder 53, and annular groove 54 will become more apparent as the description proceeds.

As previously mentioned, the inner member 22 is rotatably disposed in the outer member 20, that is, an exterior surface 56 of the inner member 22 is sized to be received in the bore 50 of the outer member 20.

As may be clearly seen in FIG. 2, a circular spring member 58 having a wave configuration is disposed within the bore 50 in engagement with the shoulder 53 formed by the annular flange 52 on the outer member 20 and with an end 60 of the inner member 22. The configuration of the spring 58 is such that it tends to bias the inner member 22 relatively out of the bore 50 in the outer member 20.

A lock ring 62 is disposed in the annular groove 54 formed in the outer member 20 and has its inner periphery disposed in an annular groove 64 formed in the outer surface 56 of the inner member 22. The lock ring 62 retains the inner member 22 within the outer member 20 against the biasing force of the spring 58. The spring 58 and the lock ring 62 provide sufficient frictional force to hold the inner member 22 in the desired rotative position relative to the outer member 20 and, yet, permit the inner member 22 to be rotated relative to the outer member by a relatively small force.

The inner member 22 includes a bore 66 extending therethrough that is concentric with the bore 50 in the outer member 20. The bore 66 is of substantially the same size as the inner periphery of the annular flange 52.

The inner member 22 also includes an annular recess 68 adjacent the bore 66. The recess 68 is located relatively near an outer end 70 of the inner member 22. As shown in FIG. 2, an annular, interior flange 72 extends into the bore 66 adjacent the outer end 70 of the inner member 22.

A sleeve 74 is disposed within the bore 66 of the inner member 22 and extends across the annular flange 52 of the outer member 20. A bead 76 encircles the exterior of an end 78 on the sleeve 74. The bead 76 is sized to be disposed in the annular recess 68 formed in the outer end 70 of the inner member 22.

To securely retain the end 78 of the sleeve 74 in the inner member 22, a ring 80 is disposed within the bore 66 in engagement with the interior flange 72 of the inner member 22. The exterior of the ring 80 tightly engages the sleeve 74 holding the bead 76 thereon in the annular recess 68.

The sleeve 74 has its other end 82 provided with an enlarged annular bead 84 that is disposed adjacent the annular flange 52 on the outer member 20, but on the opposite side of the flange 52 from the shoulder 53. A clamping member 68 having a generally U-shaped cross section, as may be clearly seen in FIG. 2, is placed over the annular bead 84 in engagement with the annular flange 52 of the outer member 20.

In constructing the valve 10, the clamping member 86 is "staked," that is, a plurality of small depressions (not shown) are made in the clamping member 86 so that it is deformed into tight engagement with the outer member 20 adjacent the "staked" portions. Thus, it can be appreciated that the end 78 of the sleeve 74 is securely connected with the inner member 22 adjacent the outer end 70 thereon and that the other end 82 of the resilient sleeve 74 is securely connected with the outer member 20 by the clamping member 86.

The sleeve 74 is constructed from a resilient elastomer, such as rubber, synthetic rubber, or a resilient and elastic plastic. The material forming the sleeve 74 must be compatible with the fluid passing through the valve 10.

Figure 4:
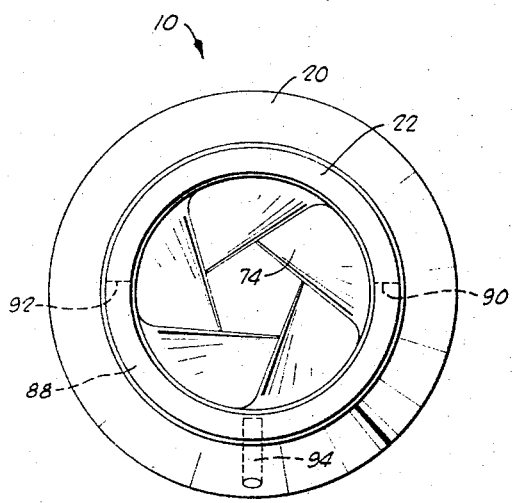
FIG. 4 is an elevation view of the valve of FIG. 1 taken substantially along the line 4—4 of FIG. 2 and illustrating the valve in a partially closed position; and, FIG. 5 is a view similar to FIG. 4, but showing the valve in the closed position.

To limit the relative rotation between the inner member 22 and the outer member 20, a groove 88 is provided in the inner member 22 extending angularly through an arc of approximately 180°, providing a pair of spaced ends 90 and 92 as shown in dash lines in FIG. 4. A stop pin 94 is mounted in the outer member 20 and extends into the groove 88 so that the pin 94 will be engageable with the ends 90 and 92 to limit the rotational movement of the inner member 22 relative to the outer member 20 as will be explained more fully in connection with the description of FIGS. 4 and 5.

As may be seen in FIG. 3, the kerfs 48 are arcuate grooves having a length substantially equal to the length of the outer member 20 as measured between the planes defining the spherical zone thereof. The kerfs 48 are provided so that the outer member 20 can be rotated approximately 90° from the position shown in FIGS. 2 and 3 and inserted or withdrawn through the opening 30 and kerfs 48 for assembly or disassembly of the valve 10. The ends 44 of the springs 42 are clearly shown extending into the opening 46 in FIG. 3.

OPERATION

As shown in FIG. 2, the valve 10 is illustrated in the open position, that is, the inner member 22 is rotated relative to the outer member 20 until the pin 94 is in engagement with the end 92 of the groove 88. When in this position, the sleeve 74 is disposed generally concentrically with respect to the bore 66 in the inner member 22 and the bore 50 in the outer member 20. The disposition of the sleeve 74 as shown in FIG. 2 permits the flow of air from the air conditioning duct (not shown) through the opening 18 in the wall 16 (see FIG. 1), through the interior of the sleeve 74 into the passenger compartment.

Referring to FIG. 4, the inner member 22 has been rotated relative to the outer member 20 until the pin 94 is disposed substantially equidistant from the ends 90 and 92 of the groove 88 in the inner member 22. As the inner member 22 is rotated relative to the outer member 20, the sleeve 74 is twisted and deformed relatively inwardly restricting the opening through the sleeve 74 as is clearly illustrated in FIG. 4. The deformation of the sleeve 74 is caused by the relative rotation of the inner and outer members 22 and 20, respectively. The attachment of the end 78 of the sleeve 74 with the inner member 22 and the attachment of the opposite end 82 of the sleeve 74 with the relatively stationary outer member 20 causes the sleeve 74 to twist as the inner member 22 is rotated.

Figure 5:
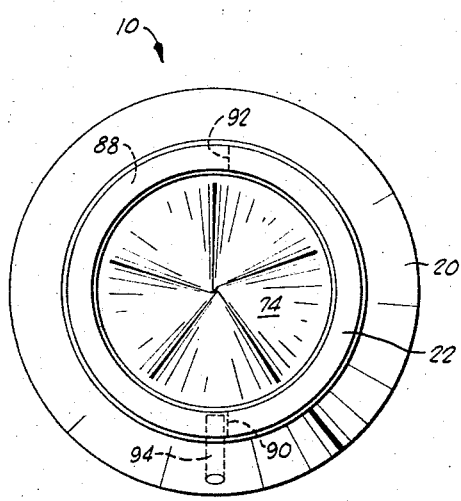

As shown in FIG. 5, the closure of the valve 10 has been completed, that is, the sleeve 74 has been deformed until the opening extending through the valve 10 is completely blocked. As can be seen in FIG. 5, the closure occurs just prior to the engagement of the pin 94 with the end 90 of the groove 88. The engagement of the pin 94 with the end 90 of the groove 88 prevents over-stressing the resilient sleeve 74, thereby extending the service life of the resilient sleeve 74.

If it is desired to open the valve 10, the inner member 22 is rotated in the opposite direction, that is, in a counter-clockwise direction until the desired opening through the sleeve 74 is attained. If the valve 10 is to be fully opened, the inner member 22 is rotated in a counter-clockwise direction until the pin 94 engages the end 92 of the groove 88. The engagement of the pin 94 with the end 92 stops the rotation of the inner member 22 with the valve 10 in the fully open position, thereby avoiding the closure of the valve 10 by movement in the opposite direction and, thus, limiting the deformation of the sleeve 74 to only one direction. Limiting the rotation of the inner member 22 relative to the outer member 20 extends the service life of the sleeve 74 and provides more ease in controlling of the opening of the valve 10 without requiring observation of the degree of deformation of the sleeve 74.

Manifestly, the direction of flow from the valve 10 can be varied by positioning the inner and outer members 22 and 20, respectively, relative to the mounting member 12. The direction may be selected as desired, regardless of the relative rotative position of the inner member 22 and the outer member 20.

One additional advantage, not previously mentioned, provided by the valve 10 is that in the full open position, the opening through the valve 10 is completely unrestricted. Thus, a large volume of air can flow through the valve 10 at relatively low velocities. The result of the high volume, low velocity air is less noise and more comfort for the passenger because a high velocity stream of air is not directed on the passenger to attain the desired environmental temperature.

It should be appreciated from the foregoing that a valve constructed in accordance with the invention can be quickly, easily and economically manufactured. Furthermore, the operating components of the valve have been reduced to a minimum providing a longer, service-free operating life for the valve.

Having described but a single structure embodying the invention, it should be understood that the structure described is presented by way of example only and that many modifications and changes can be made thereto without departing from the spirit of the invention or from the scope of the annexed claims.

What we claim is:

1. A valve comprising:
   telescopically arranged inner and outer members having coaxial bores extending therethrough, said members being rotatably relative to each other, said outer member having an exterior surface defining a spherical zone;
   a resilient sleeve of an elastomeric material having a first end attached to said inner member and a second end attached to said outer member, said sleeve being disposed within said bores and, when in the relaxed condition, being concentrically arranged with respect to said bores whereby said valve is open and, when said members are rotated relative to each other, being deformed to block said bores whereby said valve is closed; and
   a mounting member having an interior surface therein sized and shaped to receive the exterior surface of said outer member.

2. The valve of claim 1 and also including an annular seal located in the interior surface of said mounting member, said seal engaging the exterior surface of said outer member and forming a fluid-tight seal between said mounting member and outer member.

3. A valve comprising:
   a valve body including
       an outer member having a bore extending therethrough and an interior flange in said bore forming a shoulder therein; and
       an inner member partially located in said bore with one end disposed adjacent said shoulder, said inner member having a bore extending therethrough coaxially with the bore in said outer member, said inner member being rotatable relative to said outer member;
   spring means engaging said shoulder and the adjacent end of said inner member for exerting a biasing force tending to displace said end relatively away from said shoulder;
   means engaging said inner and outer members to limit movement of said end relatively away from said shoulder; and
   a resilient sleeve of an elastomeric material disposed in the bore in said inner member and having a first end connected with said inner member and a second end connected with said outer member, said sleeve being concentric with the bore in said inner member when in the relaxed condition, whereby said valve is open, said sleeve being deformable to block the bore in said inner member upon relative rotation between said members whereby said valve is closed.

4. A valve comprising:
   an outer member having a bore extending therethrough and an interior flange in said bore forming a shoulder therein, said outer member further having an exterior surface defining a spherical zone;
   an inner member partially located in said bore with one end disposed adjacent said shoulder, said inner member having a bore extending therethrough coaxially with the bore in said outer member, said inner member being rotatable relative to said outer member;
   a mounting member having an interior surface therein sized and shaped to receive the exterior surface of said outer member; and
   a resilient sleeve of an elastomeric material disposed in the bore in said inner member and having a first end connected with said inner member and a second end connected with said outer member, said sleeve being concentric with the bore in said inner member when in the relaxed condition, whereby said valve is open, said sleeve being deformable to block the bore in said inner member upon relative rotation between said inner and outer members whereby said valve is closed.

5. The valve of claim 4 and also including an annular seal located in the interior surface of said mounting member, said seal engaging the exterior surface of said outer member and forming a fluid-tight seal between said mounting member and outer member.

6. A valve comprising:
   a valve body including:
       an outer member having an exterior surface defining a spherical zone, a bore extending therethrough, an interior flange in said bore forming a shoulder therein, and an annular groove adjacent said bore,
       an inner member partially disposed in said bore and rotatable therein and having one end located relatively near said shoulder, an annular groove on the exterior thereof disposed adjacent the annular groove in outer member, and a bore extending therethrough,
       a lock ring disposed in said adjacent annular grooves to limit the movement of said end relative to said shoulder, and
       an annular resilient member engaging said end and shoulder to bias said end relatively away from said shoulder; and,
   a resilient sleeve disposed in the bore in said inner member and having one end attached to said inner member and the other end attached to said outer member, said sleeve being concentric with the bore in said inner member when in the relaxed condition, whereby said valve is open, said sleeve being deformable to block said bore when said inner member is rotated relative to said outer member, whereby said valve is closed.

7. The valve of claim 6 and also including
   a mounting member having an interior surface therein sized and shaped to receive the exterior surface of said outer member; and,
   an annular seal located in the interior surface of said mounting member, said seal engaging said mounting member and outer member and forming a fluid-tight seal therebetween.

8. The valve of claim 7 and also including limit means engageable with said inner and outer members for limiting the relative rotation therebetween.

9. The valve of claim 8 wherein said limit means includes:
a groove in said inner member encompassing an angular portion thereof in spaced parallel relation with the annular groove in said inner member; and,
a protuberance on said outer member extending radially inwardly into the groove in said inner member and engageable with said inner member at the ends of said groove to limit the relative rotation between said inner and outer members.

10. The valve of claim 6 wherein
said sleeve has an annular bead formed on the end thereof connected with said outer member, said bead being disposed in engagement with said interior flange; and
wherein said valve also includes
an annular clamping member having a generally U-shaped cross-section sized to tightly receive the end of said sleeve having the annular bead thereon, said clamping member engaging said outer member to securely connect said sleeve to said outer member; and means engaging the other end of said sleeve and biasing said sleeve into tight engagement with said inner member to securely connect the other end of said sleeve with said inner member.

References Cited
UNITED STATES PATENTS

| | | | |
|---|---|---|---|
| 2,516,805 | 7/1950 | Rother et al. | 98—41 X |
| 2,569,850 | 10/1951 | Falconer | 251—4 X |
| 2,596,869 | 5/1952 | Ross | 98—40 X |
| 2,596,909 | 5/1952 | Mufich et al. | 98—40 |
| 2,657,004 | 10/1953 | Lovington | 251—4 |

FOREIGN PATENTS

| | | |
|---|---|---|
| 16,321 | 8/1908 | Great Britain. |

MEYER PERLIN, *Primary Examiner.*

ROBERT A. O'LEARY, *Examiner.*

W. E. WAYNER, *Assistant Examiner.*

UNITED STATES PATENT OFFICE
CERTIFICATE OF CORRECTION

Patent No. 3,366,363 January 30, 1968

Clark H. Hogan et al.

It is hereby certified that error appears in the above numbered patent requiring correction and that the said Letters Patent should read as corrected below.

In the heading to the printed specification, lines 4 and 5, for "assignors to H & E Air Craft Company, Oklahoma City, Okla., a corporation of Oklahoma" read -- assignors, by mesne assignments, to Weston Hydraulics, Ltd., Van Nuys, Calif., a corporation of California --.

Signed and sealed this 22nd day of April 1969.

(SEAL)
Attest:

Edward M. Fletcher, Jr.

Attesting Officer

EDWARD J. BRENNER

Commissioner of Patents